(12) United States Patent  (10) Patent No.: US 7,107,336 B2
Bates et al.  (45) Date of Patent: Sep. 12, 2006

(54) METHOD AND APPARATUS FOR ENHANCED SERVER PAGE EXECUTION

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 09/791,520

(22) Filed: Feb. 23, 2001

(65) Prior Publication Data

US 2002/0120735 A1 Aug. 29, 2002

(51) Int. Cl.
*G06F 15/16* (2006.01)

(52) U.S. Cl. .................. 709/224; 709/203; 709/219

(58) Field of Classification Search ............... 709/224, 709/246, 203, 245, 216, 218, 129; 707/203
See application file for complete search history.

(56) References Cited

U.S. PATENT DOCUMENTS

| | | | | |
|---|---|---|---|---|
| 6,012,087 A * | 1/2000 | Freivald et al. | ............. | 709/218 |
| 6,021,437 A * | 2/2000 | Chen et al. | ................. | 709/224 |
| 6,185,608 B1 * | 2/2001 | Hon et al. | ................... | 709/216 |
| 6,219,818 B1 * | 4/2001 | Freivald et al. | ............. | 709/224 |
| 6,349,407 B1 * | 2/2002 | Towfiq | ........................ | 717/170 |
| 6,446,088 B1 * | 9/2002 | Vaduvur et al. | ............ | 709/246 |
| 6,449,657 B1 * | 9/2002 | Stanbach et al. | ............ | 709/245 |
| 6,560,633 B1 * | 5/2003 | Roberts et al. | ............. | 709/202 |
| 6,591,266 B1 * | 7/2003 | Li et al. | ....................... | 707/10 |
| 6,681,369 B1 * | 1/2004 | Meunier et al. | ............ | 715/511 |
| 6,738,757 B1 * | 5/2004 | Wynne et al. | ................. | 707/3 |
| 6,823,490 B1 * | 11/2004 | Dauerer et al. | ............ | 709/219 |
| 2001/0049703 A1 * | 12/2001 | Miyoshi et al. | ............ | 707/527 |
| 2002/0010794 A1 * | 1/2002 | Stanbach, Jr. et al. | ...... | 709/245 |
| 2002/0078087 A1 * | 6/2002 | Stone | ......................... | 707/511 |
| 2002/0091721 A1 * | 7/2002 | Mcbride et al. | ............ | 707/203 |

OTHER PUBLICATIONS

"An Introduction to Active Server Pages (ASP) and Personal Web Server for Windows 95" by Jeffrey Hasan; www.vbwm.com, 1999, pp. 1-7.

"Web Workshop" by Nancy W. Cluts, Microsoft Corporation, http//msdn.Microsoft.com/workshop/server/asp/aspatoz.asp, 1998, pp. 1-12.

* cited by examiner

*Primary Examiner*—Rupal Dharia
*Assistant Examiner*—Quang N. Nguyen
(74) *Attorney, Agent, or Firm*—Joan Pennington (57) ABSTRACT

Methods, apparatus and a computer program product are provided for implementing enhanced server page execution. A predefined file or a predefined directory is monitored for change. Responsive to identifying a change in the predefined file or the predefined directory, a server page is monitored for change. Checking the server page for change with each use is eliminated, thereby speeding up run time execution of the server page. Monitoring the predefined file or predefined directory for change can include providing a trigger function with the file or with a directory entity for the predefined directory; the trigger function to identify a change within the predefined directory. Alternatively, monitoring the predefined file or the predefined directory for change includes providing a daemon program for monitoring the predefined file or predefined directory for activity. A META tag can be used for governing when the server page is set to be monitored for change. The META tag can be used with the trigger function or with the daemon program.

19 Claims, 10 Drawing Sheets

METHOD AND APPARATUS FOR ENHANCED SERVER PAGE EXECUTION

FIELD OF THE INVENTION

The present invention relates generally to the data processing field, and more particularly, relates to a method, apparatus and computer program product for enhanced server page execution, such as enhanced Active Server Page or Java Server Page execution.

DESCRIPTION OF THE RELATED ART

With an Active Server Page (ASP) or other server page, such as a Java Server Page (JSP), it is desirable to provide improved performance. In conventional arrangements, there is a significant overhead in the use of server pages.

For example, ASPs and JSPs currently are placed in predefined directories. When either an ASP or JSP is used for the first time the ASP or JSP must be compiled into ASP or JSP code. On every subsequent use of the ASP or JSP code, the ASP or JSP is checked to see if the ASP or JSP has changed. This constant checking for change results in a significant overhead in the use of server pages.

A need exists to provide an improved method, apparatus and computer program product for enhanced server page execution, such as for enhanced Active Server Page or for enhanced Java Server Page execution.

SUMMARY OF THE INVENTION

A principal object of the present invention is to provide a method, apparatus and computer program product for implementing enhanced server page execution, such as enhanced Active Server Page or Java Server Page execution. Other important objects of the present invention are to provide such methods, apparatus and computer program product for implementing enhanced server page execution substantially without negative effect and that overcome many of the disadvantages of prior art arrangements.

In brief, methods, apparatus and computer program product are provided for implementing enhanced server page execution. A predefined file or a predefined directory is monitored for change. Responsive to identifying a change in the predefined file or predefined directory, a server page is monitored for change. Checking the server page for change with each use is eliminated, thereby speeding up run time execution of the server page.

In accordance with features of the invention, monitoring the predefined file or the predefined directory for change can include providing a trigger function with the predefined file or with a directory entity for the predefined directory; the trigger function to identify a change within the predefined directory. Alternatively, monitoring the predefined file or the predefined directory for change includes providing a daemon program for monitoring the predefined file or the predetermined directory for activity. A META tag can be used for governing when the server page is set to be monitored for change. The META tag can be used with the trigger function or with the daemon program.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
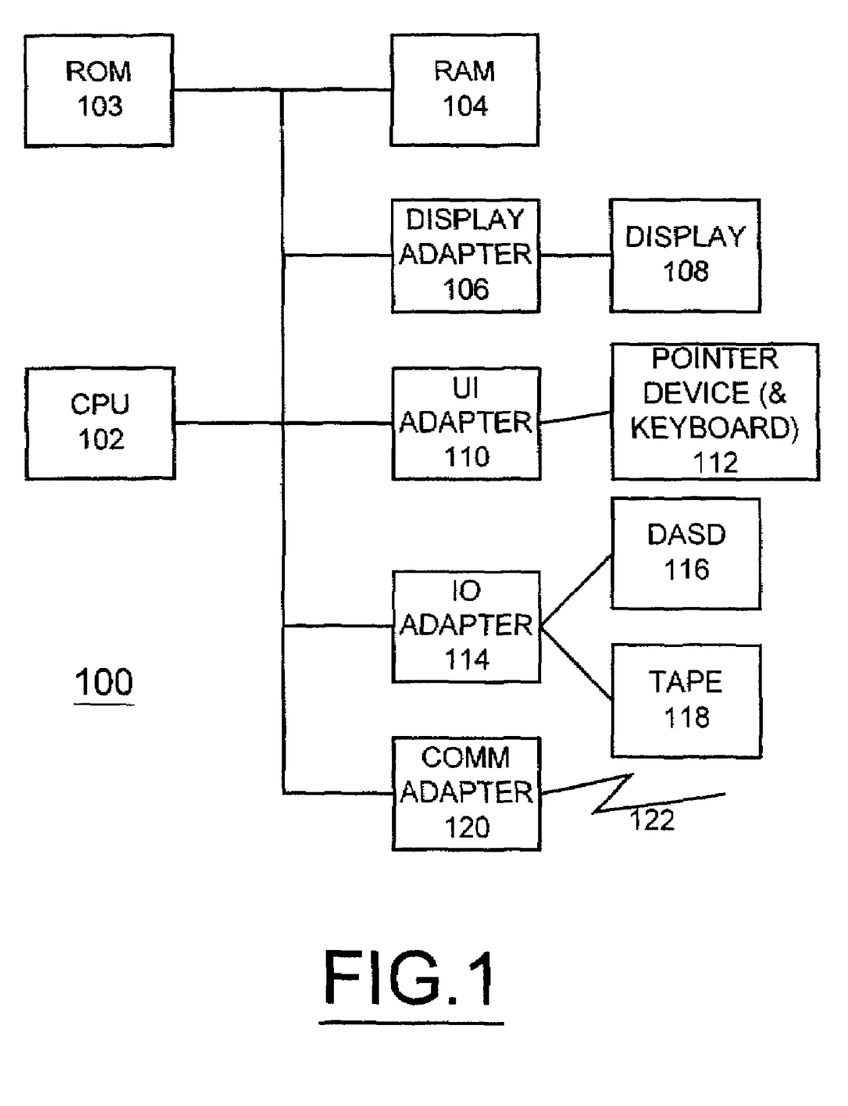
FIGS. 1 and 2 are block diagram representations illustrating a computer system and computer operating system for implementing methods for enhanced server page execution, such as enhanced Active Server Page or Java Server Page execution in accordance with the preferred embodiment.
Figure 2:
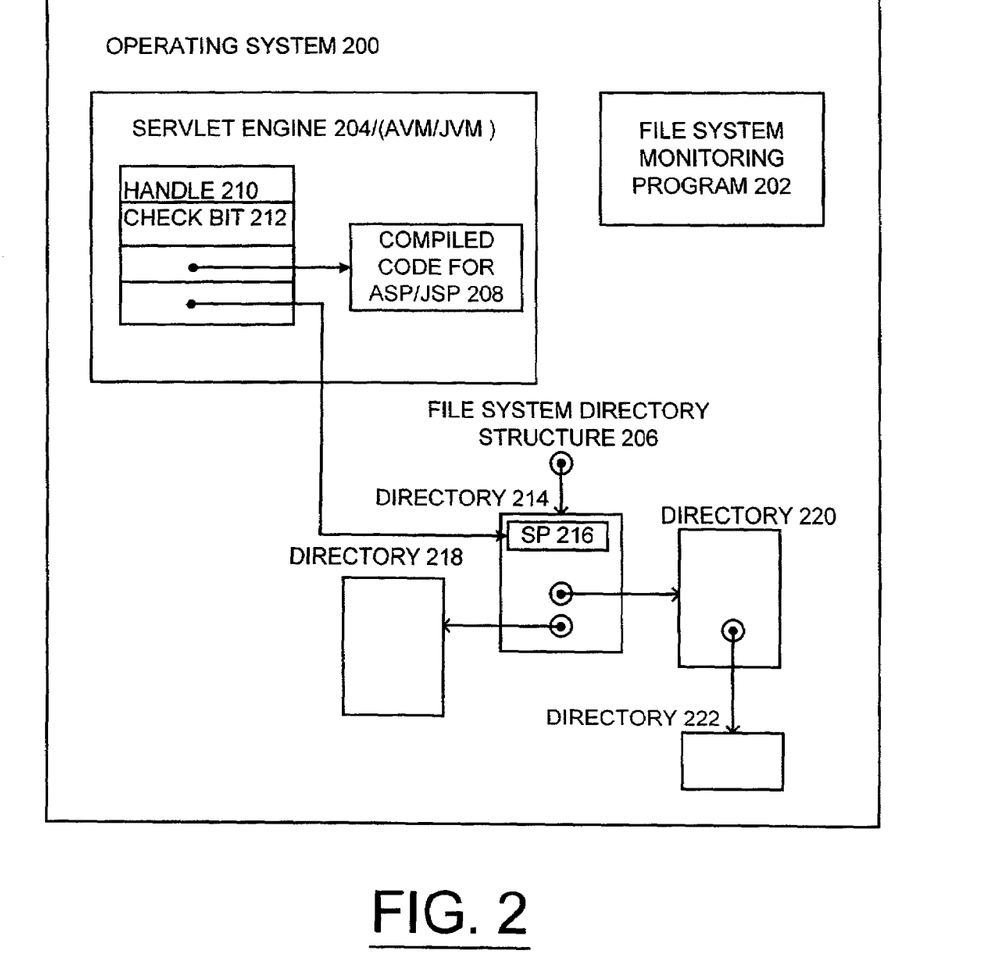

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114, for example, connected to a direct access storage device (DASD) 116 and a tape unit 118. CPU 102 is connected to a communications adapter 120 providing a communications network connection function with a network 122.

Figure 3A:
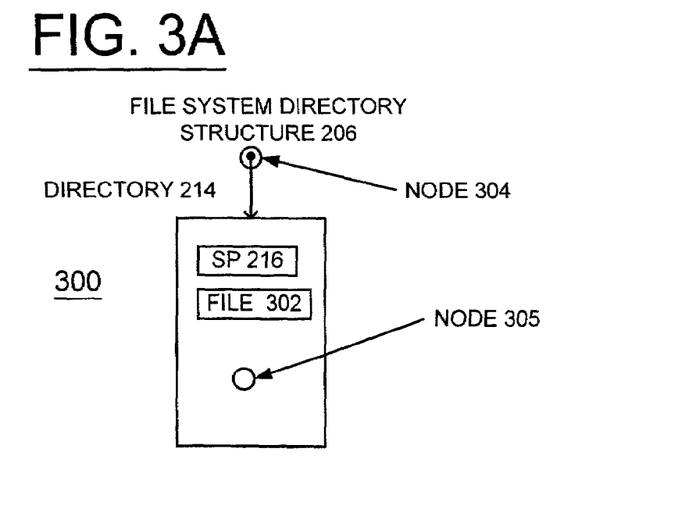
FIGS. 3A and 3B are diagrams illustrating an exemplary directory structure in accordance with the preferred embodiment.
Figure 3B:
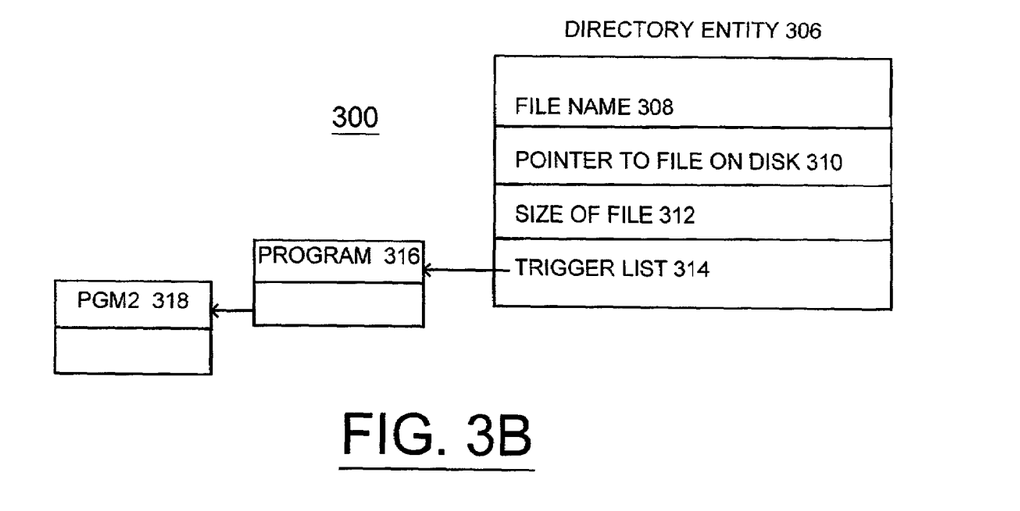

Computer system 100 includes an operating system 200 and a file system monitoring program 202 of the preferred embodiment. In accordance with features of the preferred embodiment, a running servlet engine 204, such as an Active or Java Virtual Machine (AVM or JVM), is informed by the file system monitoring program 202 when any change occurs in a predefined file or predefined directory, such as an illustrated file system directory structure 206 in FIGS. 2 and 3. A compiled ASP or Java code 208 for an ASP or JSP includes a handle 210 to identify the compiled code and a check bit 212 of the preferred embodiment to indicate when checking the server page for changes is needed. File system directory structure 206 illustrates a hierarchical file system and includes a first directory 214 including an ASP or JSP 216 and pointers to a second directory 218 and a third directory 220. The third directory 220 points to a fourth directory 222. In accordance with features of the preferred embodiment, the file system monitoring program 202 can monitor one directory, such as the first directory 214 or all directories 214, 218, 220 and 222 in the file system directory structure 206. When a change is identified in the predefined directory 214 or directories 214, 218, 220 and 222, then the servlet engine 204 checks for server page changes. The conventional constant checking for change with each use of the compiled code 208 is eliminated, thereby speeding up run time execution.

Central processor unit 102 is suitably programmed to execute the flow charts of FIGS. 4A, 4B, 5, and 6 of the preferred embodiment and for monitoring a predefined file or a file system directory structure 206 including multiple directories 214, 218, 220 and 222 or a single directory 214 or a predefined file 302, such as illustrated and described with respect to FIGS. 2 and 3A and 3B.

Computer 100 may be implemented using any suitable computer, such as an IBM personal computer running the OS/2® operating system. Computer 100 could be connected directly to network 122 via communications adapter 120 or could be connected indirectly, such as via a Local Area Network, not shown.

Referring now to FIGS. 3A and 3B, an exemplary format 300 of the file system directory structure 206 is shown including ASP/JSP 216 and a file 302. A pair of nodes or directory files 304 and 305 is shown with the directory 214. Each of the nodes 304 and 305 contains a number of directory entities 306. A directory, such as directory 214 contains an entity 306 for each file 302 within the directory. The directory entities or records 306 contain information, such as a file name 308, a pointer to an actual location of the file on disk 310, a size of file 312 within the nodes or directory files 304, 305. The directory entities or records 306 are usually arranged in a tree structure for quick access to a given file.

In accordance with features of the preferred embodiment, the directory entities or records 306 contain a trigger list 314. The trigger list 314 is a set of routines or programs 316, 318 that are called when the file associated with the entity 306 is updated.

Figure 4A:
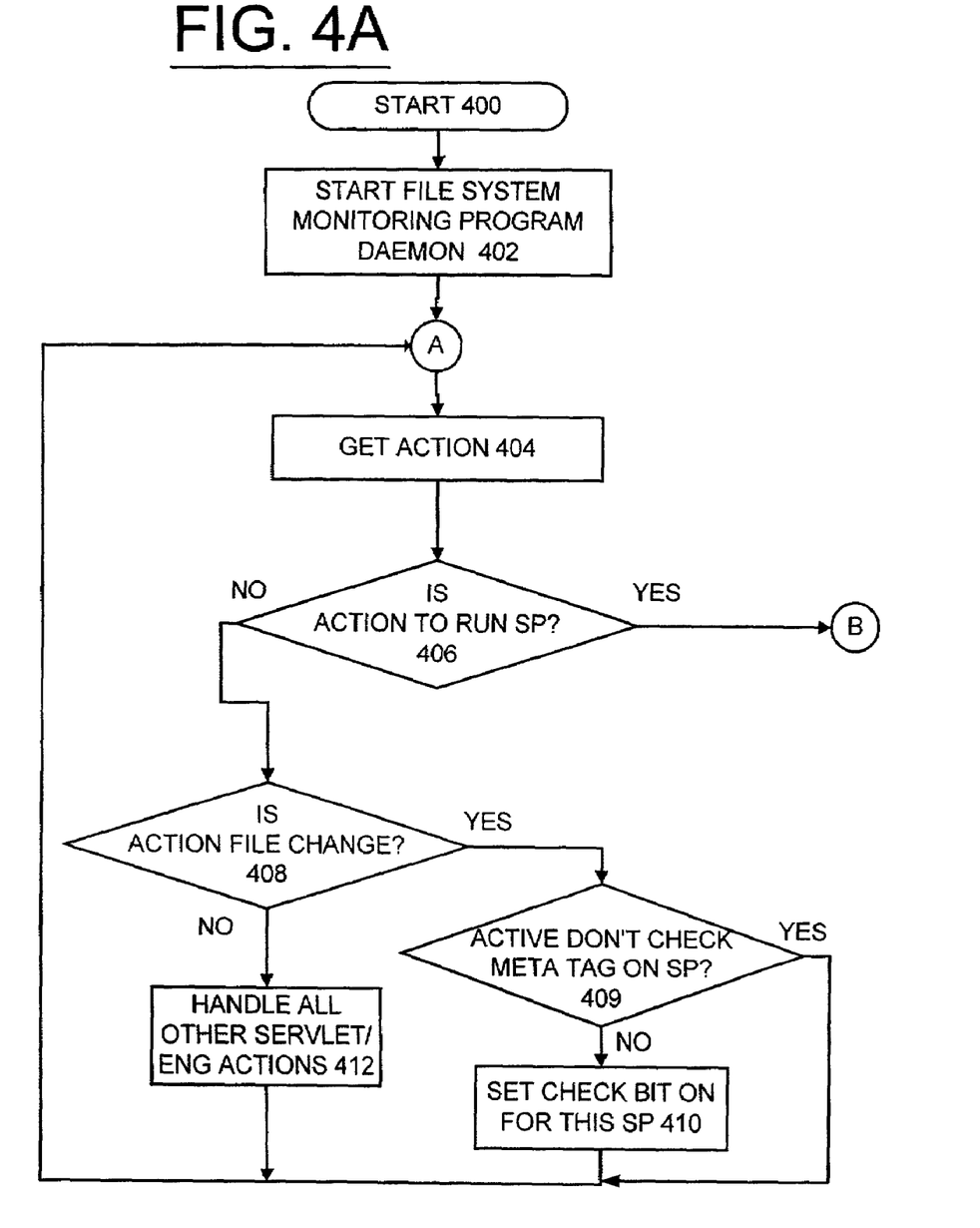
FIGS. 4A, 4B, 5, 6, 7 and 8 are flow charts illustrating exemplary sequential steps for enhanced server page execution in accordance with the preferred embodiment.
Figure 4B:
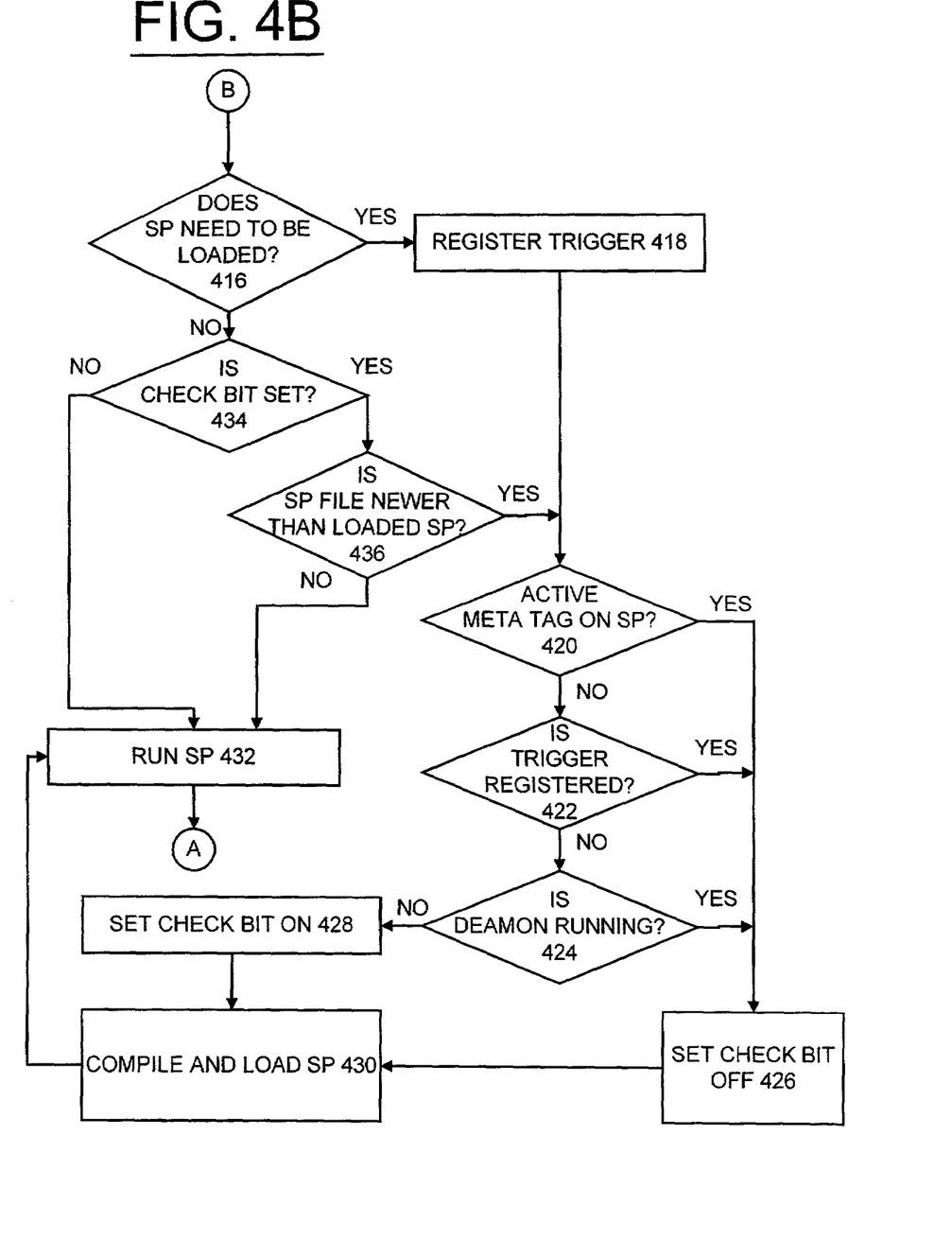

Referring now to FIGS. 4A and 4B, there are shown exemplary sequential steps performed by the servlet engine 204 for enhanced server page execution in accordance with the preferred embodiment starting at a block 400. The file system monitoring program deamon is started as indicated at a block 402. An action is obtained as indicated at a block 404. Checking whether the action is to run a server page, such as an ASP or JSP, is performed as indicated at a decision block 406. When the action is to run a server page, then the sequential operations continue following entry point B in FIG. 4B. When the action is not to run a server page, then checking whether the action is a file change is performed as indicated at a decision block 408. When the action is a file change, then checking whether there is an active don't check META tag on the server page is performed as indicated in a decision block 409. The active don't check META tag on the server page is one where, for example, there is either no data specified or the date indicates it is active. If not, then a check bit is set on for this server page as indicated at a block 410. When there is an active don't check META tag on the server page, then the sequential operations return to entry point A in FIG. 4A to get a next action at block 404. When the action is not a file change, all other servlet engine actions are handled as indicated at a block 412. Then the sequential operations return to entry point A in FIG. 4A to get a next action at block 404.

Referring to FIG. 4B following entry point B, checking whether the server page needs to be loaded is performed as indicated at a decision block 416. When the server page is to be loaded, then in accordance with one embodiment of the preferred embodiment a trigger is registered as indicated at a block 418. Next checking for an active META tag on the server page is performed as indicated at a decision block 420. If not, then checking for a trigger registered is performed as indicated at a decision block 422. If no trigger is registered, then checking whether a deamon is running is performed as indicated at a decision block 424. When the META tag is on the server page indicating that checking should not be done at decision block 420, the trigger is registered at decision block 422, or the deamon is running at decision block 424, then the check bit 212 is set OFF as indicated at a block 426. Otherwise when the deamon is not running at decision block 424, then the check bit 212 is set ON as indicated at a block 428. After the check bit 212 is set either ON or OFF, next the server page is compiled and loaded as indicated at a block 430. Next the server page is run as indicated at a block 432. Then the sequential operations continue following entry point A in FIG. 4A. When the server page does not need to be loaded at decision block 416, then checking whether the check bit is set is performed as indicated at a decision block 434. If the check bit is not set then the server page is run at block 432. If the check bit is set then checking whether the server page file is newer than loaded server page is performed as indicated at a decision block 436. If yes, then the META tag is checked at decision block 420. If the server page file is not newer than the loaded server page then the server page is run at block 432. Then the sequential operations continue following entry point A in FIG. 4A.

Examples of META tags for governing when the check bit 212 for a server page will be set include the following:

<META name="NOCHANGE">

<META name="CHECKAFTER" content="Jan. 23, 2006">

In accordance with features of the preferred embodiment, the file system monitoring program 202 of the preferred embodiment can include one of or a combination of META tags, trigger lists and deamons. The META tags at decision block 420 advantageously may be used with both checking the trigger registered at decision block 422 and the deamon running at decision 424. Typically either checking the trigger registered at decision block 422 or checking the deamon running at decision 424 would be performed by the file system monitoring program 202 of the preferred embodiment.

Figure 5:
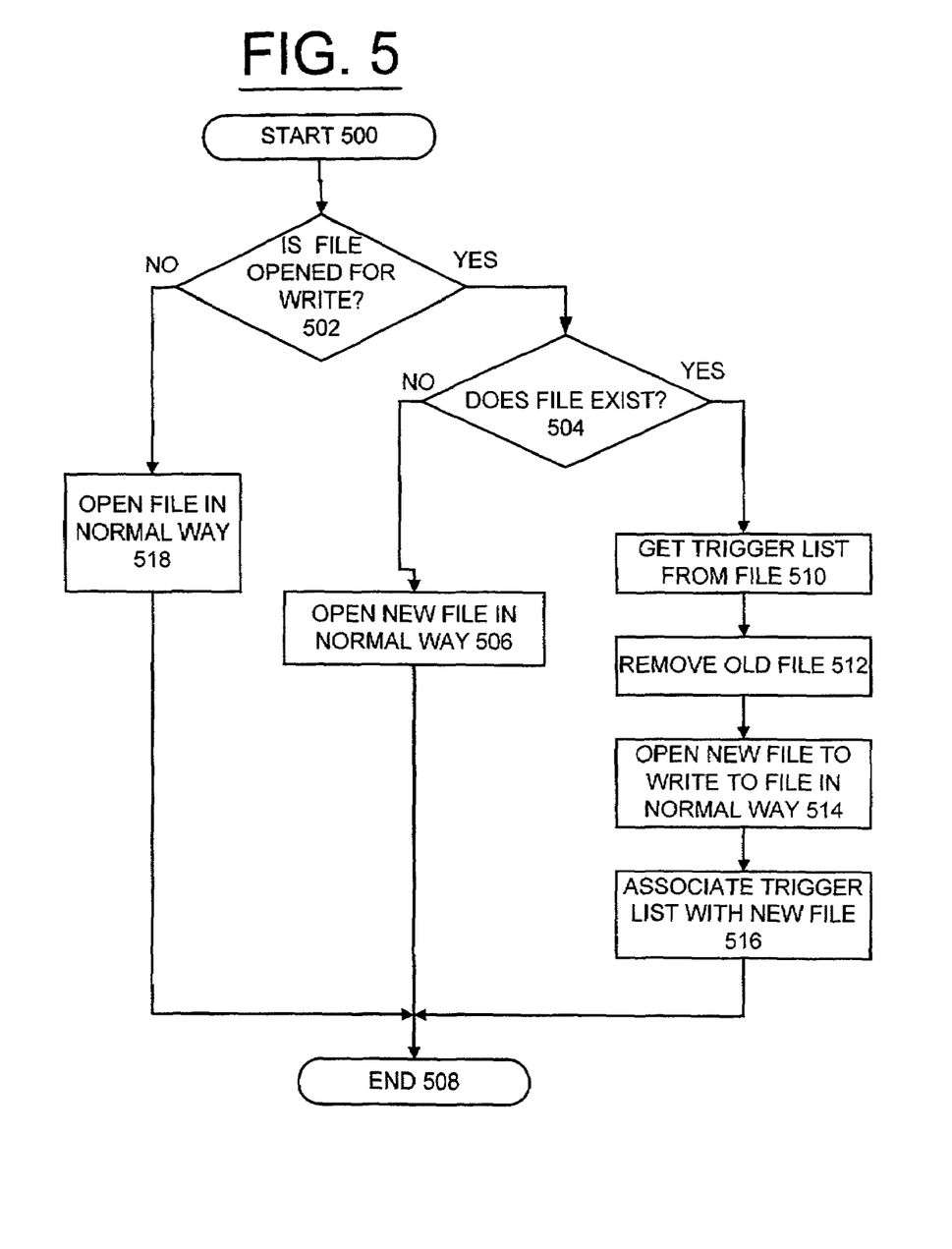

Referring now to FIG. 5, there are shown exemplary sequential steps of an open routine performed by operating system 200 for enhanced server page execution in accordance with the preferred embodiment starting at a block 500. Checking whether the file is opened for a write is performed as indicated in a decision block 502. If so, then checking whether the file exists is performed as indicated in a decision block 504. If the file does not exist, then the new file is opened in the normal way as indicated in a block 506. This completes the sequential operations as indicated at a block 508. Otherwise, when the file exists a trigger list is obtained from the file as indicated in a block 510. Next the old file is removed as indicated in a block 512. A new file is opened to write to file in the normal way as indicated in a block 514. Then the trigger list is associated with the new file as indicated in a block 516. This completes the sequential operations at block 508. When determined that the file is not opened for write at decision block 502, then the file is opened in the normal way as indicated in a block 518. This completes the sequential operations at block 508.

Figure 6:
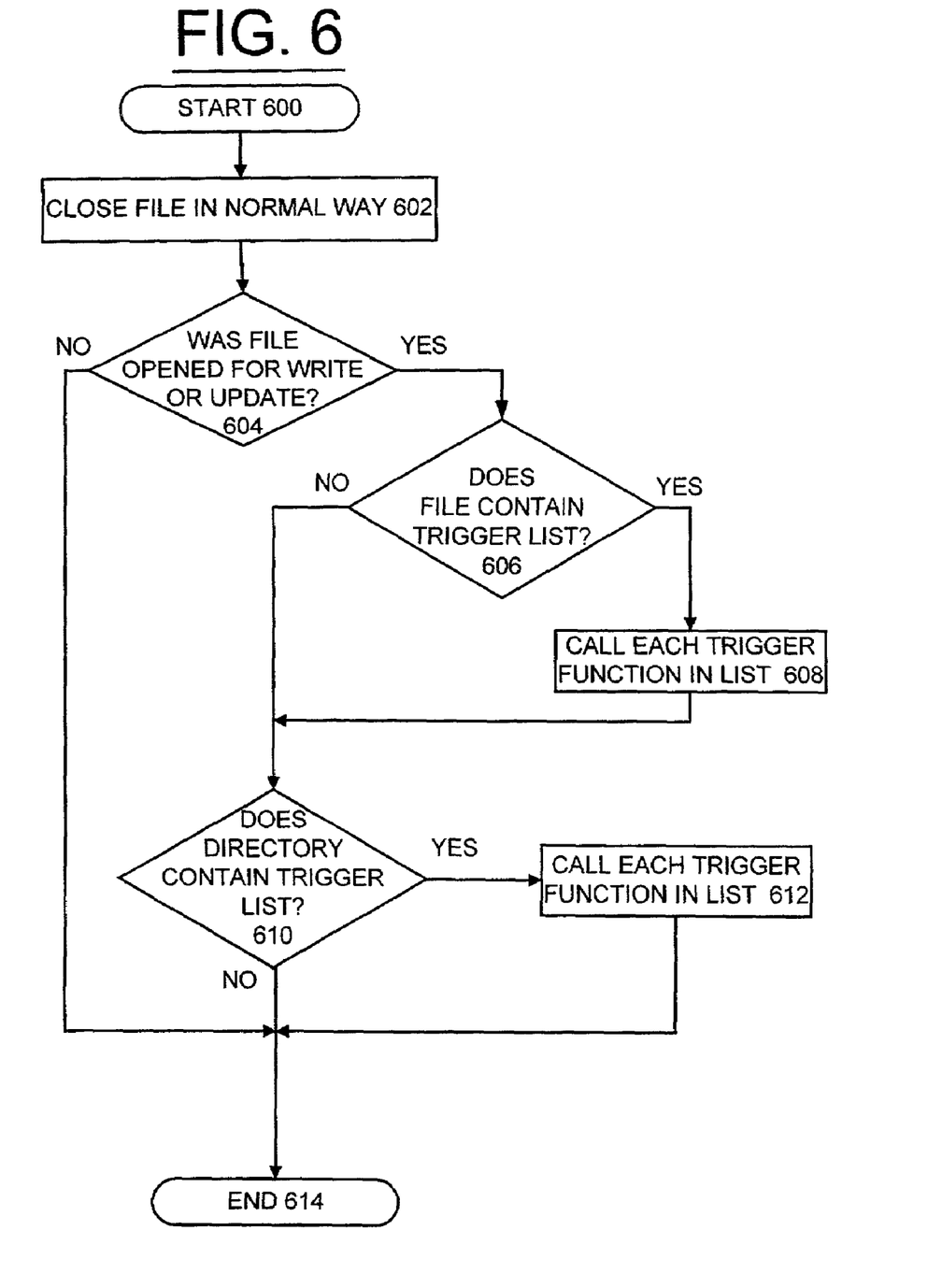

Referring now to FIG. 6, there are shown exemplary sequential steps of a close routine performed by operating system 200 for enhanced server page execution in accordance with the preferred embodiment starting at a block 600. First the file is closed in the normal way as indicated in a block 602. Checking whether the file was opened for write or update is performed as indicated in a decision block 604. If yes, then checking whether the file contains a trigger list is performed as indicated in a decision block 606. If the file contains a trigger list, then each trigger function in the list is called as indicated in a block 608. Then checking whether the directory contains a trigger list is performed as indicated in a decision block 610. If the directory contains a trigger list, then each trigger function in the list is called as indicated in a block 612. This completes the sequential operations as indicated in a block 614. If determined that the file was not opened for write or update at decision block 604 this completes the sequential operations at block 614.

Figure 7:
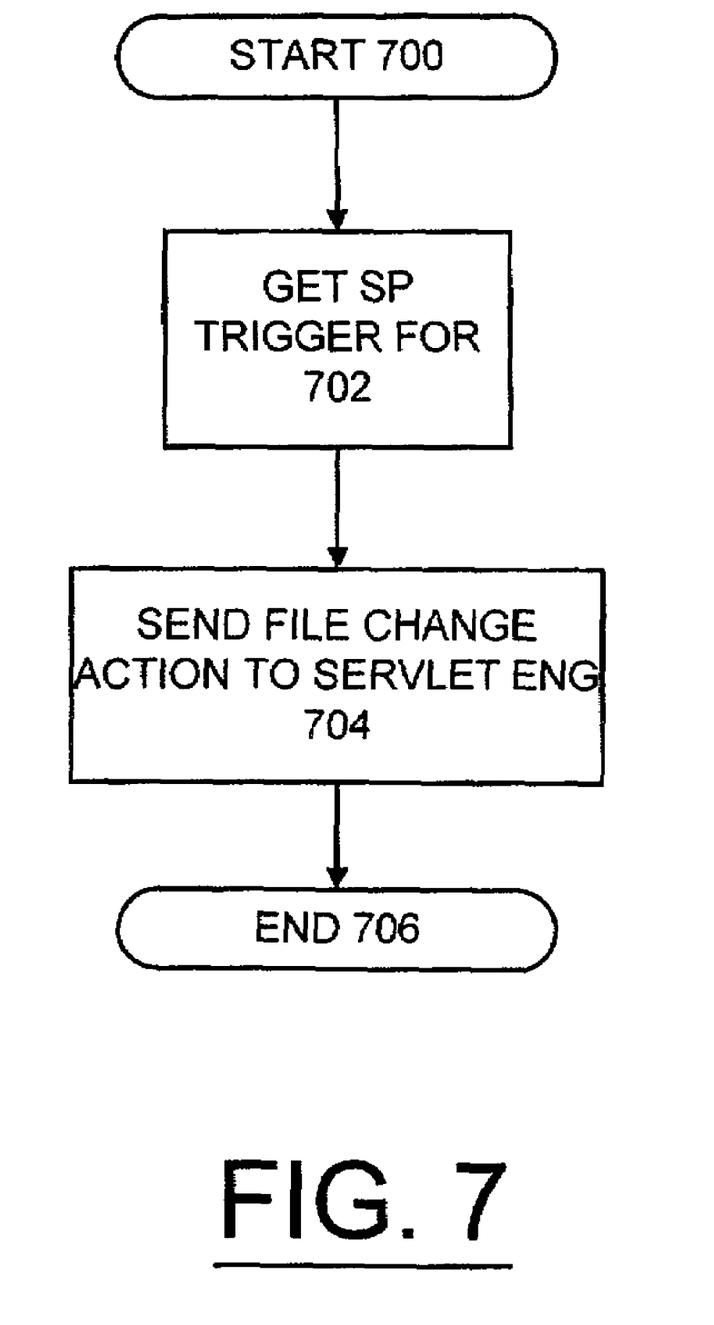

Referring now to FIG. 7, there are shown exemplary sequential steps of a trigger function for enhanced server page execution in accordance with the preferred embodiment starting at a block 700. A server page trigger is obtained for a server page, for example the server page trigger is passed in as a parameter, as indicated at a block 702. The server page trigger function is called by the operating system 200 after a program has opened a file for write or update on close, this trigger function is called. Next the file change action is sent to the servlet engine 204 as indicated at a block 704. This completes the sequential operations as indicated at a block 706.

Figure 8:
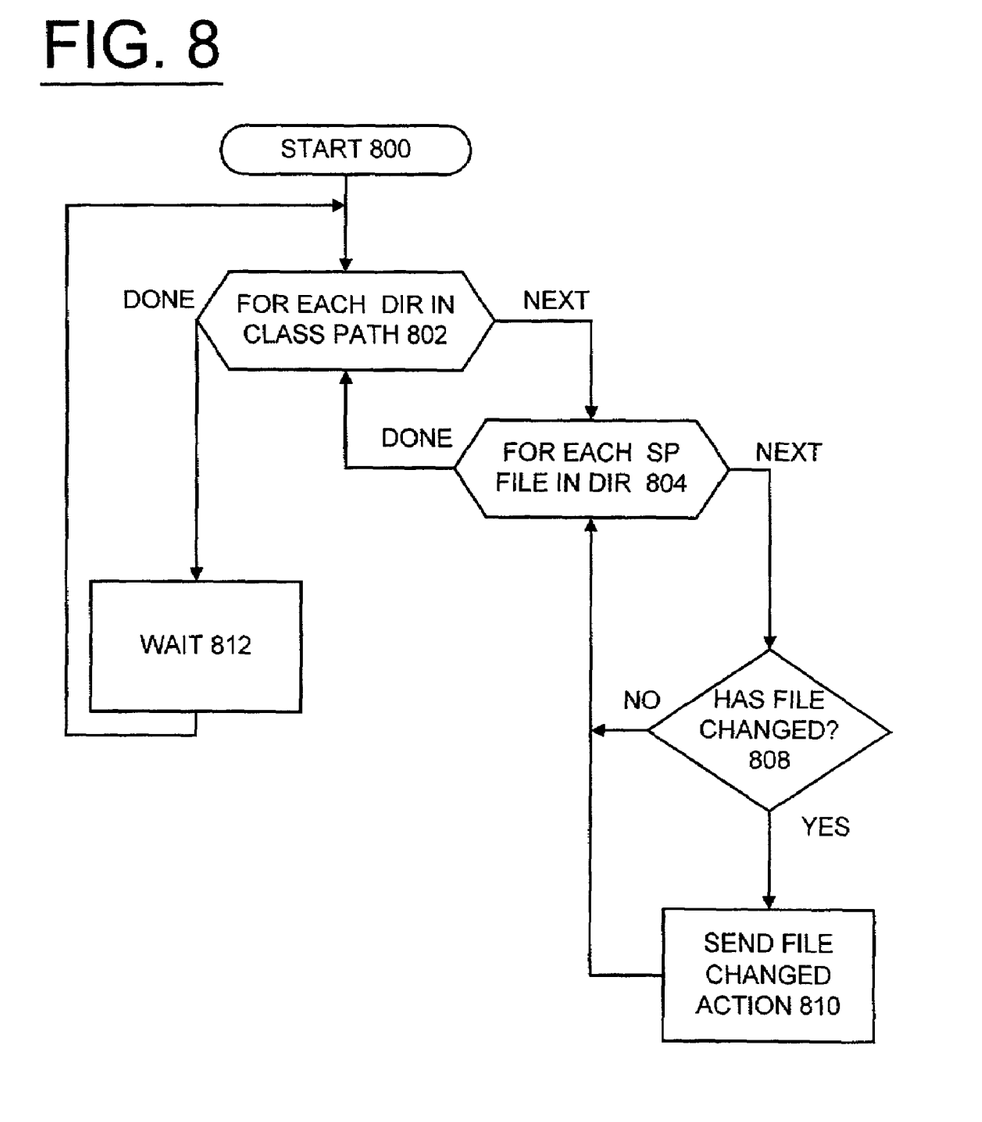

Referring now to FIG. 8, there are shown exemplary sequential steps of a file system monitoring program deamon for enhanced server page execution in accordance with the preferred embodiment starting at a block 800. For each directory in class path as indicated at a block 802 and for each server page file in each directory as indicated at a block 804, checking whether the file has changed is performed as indicated at a decision block 808. When the file has changed, then a file changed action is sent as indicated at a block 810. Then after a predefined delay or wait as indicated at a block 812, then the sequential operations are repeated.

Figure 9:
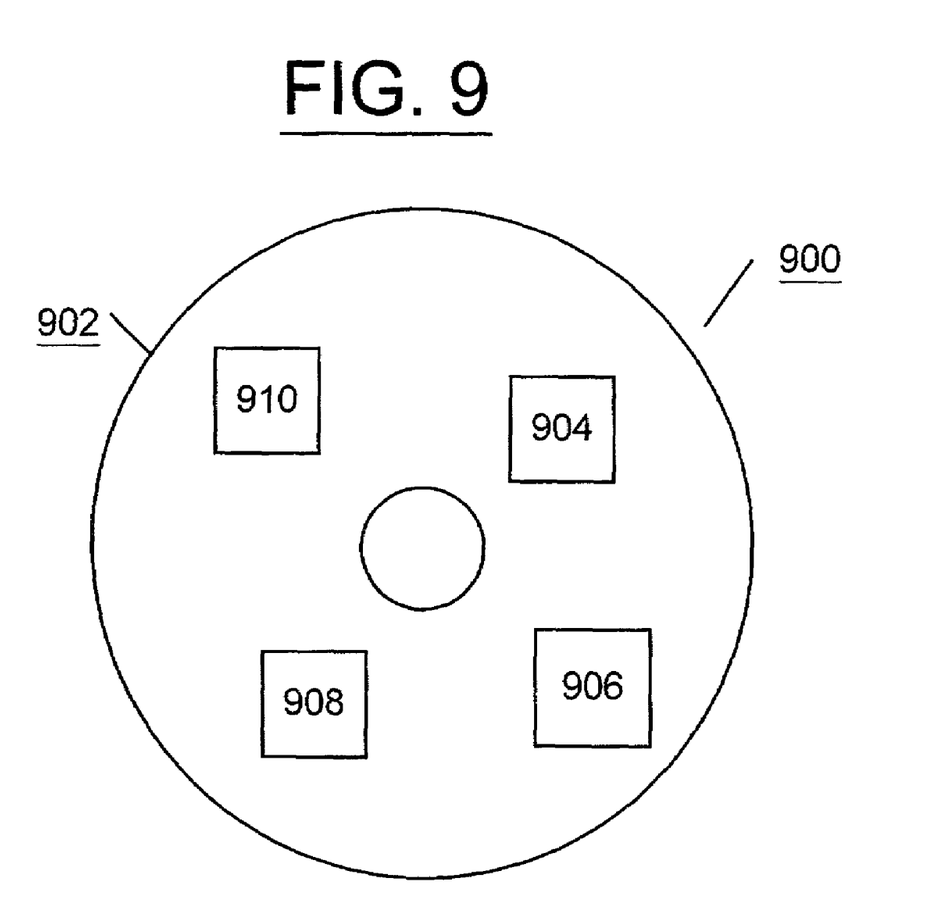
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 902 stores program means 904, 906, 908, 910 on the medium 902 for carrying out the methods for implementing enhanced server page execution of the preferred embodiment in the system 100 of FIGS. 1 and 2.

A sequence of program instructions or a logical assembly of one or more interrelated modules defined by the recorded program means 904, 906, 908, 910, direct the computer system 100 for implementing enhanced server page execution of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing enhanced server page execution comprising the steps of:
   loading a server page;
   monitoring a predefined file or a predefined directory for change;
   responsive to identifying a change in said predefined file or said predefined directory, setting a check bit on for monitoring said server page for change; and
   receiving an action to run said server page and responsive to said check bit being off, running said server page without checking said server page for change.

2. A computer-implemented method for implementing enhanced server page execution as recited in claim 1 wherein the step of monitoring said predefined directory for change includes the step of providing a trigger function with said predefined file or with a directory entity for said predefined directory; said trigger function to identify a change within said predefined file or said predefined directory.

3. A computer-implemented method for implementing enhanced server page execution as recited in claim 2 wherein said trigger function is called by an operating system when an associated server page file has been modified upon close of file.

4. A computer-implemented method for implementing enhanced server page execution as recited in claim 2 wherein said trigger function is called by a trigger list included in a directory entity when an associated file with said directory entity is changed.

5. A computer-implemented method for implementing enhanced server page execution as recited in claim 1 wherein the step of monitoring said predefined file or said predefined directory for change includes the step of providing a daemon program for monitoring said predefined file or said predefined directory for activity.

6. A computer-implemented method for implementing enhanced server page execution as recited in claim 5 wherein the step of providing said daemon program for monitoring said predefined directory for activity includes the steps of monitoring for a file change for each directory in a class path and for each server page.

7. A computer-implemented method for implementing enhanced server page execution as recited in claim 5 includes the steps responsive to an identified file change, sending a filed changed action to a servlet engine; and said servlet engine monitoring said server page for change.

8. A computer-implemented method for implementing enhanced server page execution as recited in claim 1 wherein the step of monitoring said predefined file or said predefined directory for change includes the step of providing a META tag within said server page; said META tag for governing when said server page is set to be monitored for change.

9. A computer-implemented method for implementing enhanced server page execution as recited in claim 1 wherein said predefined directory includes a file system directory structure; said file system directory structure including a plurality of directories.

10. A computer program product for implementing enhanced server page execution in a computer system including a central processor unit, said computer program product including a plurality of computer executable instructions stored on a computer readable medium, wherein said instructions, when executed by said central processor unit, cause the central processor unit to perform the steps of:
    executing a server page;
    monitoring a predefined file or a predefined directory for change
    responsive to identifying a change in said predefined file or said predefined directory, setting a check bit on for monitoring said server page for change; and
    receiving an action to run said server page and responsive to said check bit being off, running said server page without checking said server page for change.

11. A computer program product for implementing enhanced server page execution as recited in claim 10 wherein said predefined directory includes a file system directory structure; said file system directory structure including a plurality of directories.

12. A computer program product for implementing enhanced server page execution as recited in claim 10 wherein the step of monitoring said predefined directory for change includes the step of providing a trigger function with said predefined file or with a directory entity for said predefined directory; said trigger function to identify a change within said predefined file or said predefined directory.

13. A computer program product for implementing enhanced server page execution as recited in claim 10 wherein the step of monitoring said predefined directory for change includes the step of providing a daemon program for monitoring said predefined file or said predefined directory for activity.

14. A computer program product for implementing enhanced server page execution as recited in claim 10 wherein the step of monitoring said predefined file or said predefined directory for change includes the step of providing a META tag within said server page; said META tag for governing when said server page is set to be monitored for change.

15. Apparatus for implementing enhanced server page execution comprising:
   a servlet engine for executing a server page;
   a file system monitoring program for monitoring a predefined file or a predefined directory for change and for notifying said servlet engine of an identified change in said predefined file or said predefined directory;
   said servlet engine responsive to said identified change, for setting a check bit on for monitoring said server page for change; and
   said servlet engine responsive to receiving an action to run said server page and responsive to said check bit being off, running said server page without checking said server page for change.

16. Apparatus for implementing enhanced server page execution as recited in claim 15 wherein said file system monitoring program includes a trigger function provided with a directory entity for said predefined directory; said trigger function to identify a change within said predefined file or said predefined directory.

17. Apparatus for implementing enhanced server page execution as recited in claim 15 wherein said file system monitoring program includes a daemon program for monitoring said predefined file or said predefined directory for activity.

18. Apparatus for implementing enhanced server page execution as recited in claim 15 wherein said file system monitoring program includes a META tag provided within said server page; said META tag for governing when said server page is set to be monitored for change.

19. Apparatus for implementing enhanced server page execution as recited in claim 15 wherein said predefined directory includes a file system directory structure; said file system directory structure including a plurality of directories.

* * * * *